United States Patent [19]
Gambino et al.

[11] Patent Number: 5,538,803
[45] Date of Patent: Jul. 23, 1996

[54] MULTIBIT TAG USING BARKHAUSEN EFFECT

[75] Inventors: Richard J. Gambino, Stoney Brook; Robert J. von Gutfeld, New York, both of N.Y.

[73] Assignee: International Business Machines Corporation, Armonk, N.Y.

[21] Appl. No.: 344,196

[22] Filed: Nov. 23, 1994

[51] Int. Cl.[6] ............................................. G11B 5/66
[52] U.S. Cl. .................... 428/694 TM; 428/900; 235/449; 235/493; 340/551; 427/128; 427/130; 427/548; 204/192.2
[58] Field of Search ................ 428/694 TM, 900; 235/449, 493; 340/551; 427/128, 130, 548; 204/192.2

[56] References Cited

U.S. PATENT DOCUMENTS

| | | | |
|---|---|---|---|
| 4,158,434 | 6/1979 | Peterson | 235/382 |
| 4,281,043 | 7/1981 | Deffeyes | 428/457 |
| 4,940,966 | 7/1990 | Pettigrew et al. | 340/551 |
| 4,960,651 | 10/1990 | Pettigrew et al. | 428/607 |
| 4,980,670 | 12/1990 | Humphrey et al. | 340/551 |
| 5,001,458 | 3/1991 | Tyrén et al. | 340/551 |
| 5,181,010 | 1/1993 | Furukawa et al. | 340/551 |
| 5,313,192 | 5/1994 | Ho et al. | 340/551 |
| 5,368,948 | 11/1994 | Davies | 428/611 |

FOREIGN PATENT DOCUMENTS 0516244  12/1992  European Pat. Off. .

*Primary Examiner*—Stevan A. Resan
*Attorney, Agent, or Firm*—Whitham, Curtis, Whitham & McGinn; Stephen S. Strunck

[57] ABSTRACT

An identification tag which can be encoded with multiple bits of information and can be remotely interrogated and read includes a plurality of magnetic elements. The information is stored in the magnetic elements which produce a large domain wall displacement (Barkhausen jump) at a particular magnetic field.

23 Claims, 2 Drawing Sheets

MULTIBIT TAG USING BARKHAUSEN EFFECT

BACKGROUND OF THE INVENTION

1. Field of the Invention

The present invention generally relates to an identification tag and more particularly to an identification tag which can be encoded with multiple bits of information and which can be remotely interrogated and read, and further to a method of producing the tag.

2. Cross-reference to Related Applications

The invention disclosed and claimed herein is related to the inventions disclosed and claimed in co-pending applications Serial Nos. 08/344,805, 08/344,296, 08/344,771 and 08/344,808.

3. Description of the Related Art

For retail tagging, tagging used in the road/air-freight package industry, personnel identification tagging, pallet tagging in manufacturing processes, etc., a tag is required for identifying a product, article or person in detail. With a sufficient number of bits, the tag can be interrogated to determine what the product is, its date of manufacture, its price, whether the product, article or person has been properly passed through a check-out counter or kiosk, etc. Further, identifying the product via a tag can lead to a new type of check-out system for the retail industry giving rise to the much hoped for "no-wait check-out".

Conventional tags and tag systems have had a number of problems including: 1) having only one bit, typical of anti-theft tags, 2) requiring a large amount of power to read the tag, thus requiring a tag battery (or other suitable power source), and 3) being relatively easy to defeat by tampering.

Multibit, remotely-sensed tags are needed for retailing, inventory control and many other purposes. For many applications, the cost must be low and the tags must to be individually encoded. Further, when the tag is interrogated it must produce a distinctive signal to reliably identify the article to which the tag is coupled.

Further, conventional tags have employed the Barkhausen jump effect. However, the Barkhausen jump effect has been used in tags having only a single bit element. Hitherto the invention, tags using the Barkhausen effect have not been transferred to multibit arrays or markers working in concert since this requires a method for personalizing each bit so that it switches at a field without affecting the other bits of the tag. Generally, the Barkhausen effect is characterized by a tendency for magnetization to occur in discrete steps rather than by continuous change, thereby giving rise to a large flux change with time, $d\phi/dt$, which is key for inducing a sizable voltage in a sensing or pickup coil.

For example, one conventional system uses a large Barkhausen effect from depositions on, for example, a polymer substrate with the system being useful in applications relating to electronic article surveillance and rotation sensors. A number of procedures are available for producing the Barkhausen material including oblique sputtering, heat treatments and generating magnetic fields during and after deposition to obtain maximum flux jumps.

A second layer of hard or semi-hard magnetic material is deposited on the same substrate to provide a means for activating or deactivating the sensor by way of a magnetic field produced by a direct current (DC).

However, this conventional system fails to include an array of Barkhausen elements designed to switch (that is, change its direction of magnetization) as a function of an externally ramped magnetic field with the required field for switching controlled by a third magnetic layer acting as a variable magnetic shunt, differing in thickness for each element.

Further, the conventional system is only for a single bit element using a single Barkhausen layer with no ability to develop a code to distinguish items.

In a second conventional system, a single bit element is employed in which the Barkhausen jump is used to construct an electronic article surveillance tag.

However, this system is deficient in terms of having a three-layer configuration designed to switch at different applied magnetic fields to form a multibit tag. This conventional system uses a second hard magnetic layer deposited on the tag substrate for tag activation/deactivation purposes. Means for producing several identical markers from a single set of deposition/annealing processes are provided, in which a narrow zone is created, from which individual tags can be cut apart without damage. Once separated, the cut-apart tags each serve as individual single bit electronic article surveillance (EAS) markers. However, these markers are not for use in concert or as a multibit array.

Further, this system fails to include means for developing a code by switching at various levels of applied magnetic fields and thus there is no multibit Barkhausen tag for purposes similar to that of the present invention.

Another single-bit conventional tag device includes a hysteresis loop, as shown in FIG. 1A. The active elements of the tag are made of a magnetic material. The tag having the hysteresis loop of FIG. 1A is produced by annealing certain magnetic alloys in a demagnetized (multiple domain) state. Generally, materials (e.g., such as ferromagnetic materials) are divided into magnetic domains, with each domain having a net magnetization even without an external field. A bulk sample will generally not have a net magnetization since the spontaneous magnetization in the various domains will cancel each other due to their random orientations.

The annealing process changes the magnetic anisotropy (e.g., direction of magnetization) so that the domain walls (of the material) become pinned at the positions they had during the annealing process. The walls remain pinned until a predetermined, critical field $H_j$ is exceeded.

At this critical field, the domain walls overcome the barrier to wall displacement and suddenly move a relatively large distance (such as, for example, 100 μm). This wall motion causes a sudden change in magnetization which can be detected in a pickup coil when an applied field exceeds $H_j$.

FIG. 1A illustrates a hysteresis loop (M vs. H) of a low magnetostriction amorphous alloy after annealing in the demagnetized state for 30 minutes. FIG. 1B illustrates the loop after annealing for one hour. The other significance of these loops is that as shown in FIG. 1B, the major change in magnetization (M) occurs at $H_j$, the critical field for the Barkhausen jump. In contrast to FIG. 1A, a much smaller discontinuity in M occurs for FIG. 1B so that a more favorable value of $d\phi/dt$ occurs for the hysteresis loop of FIG. 1A, as a result of the longer annealing treatment.

As discussed above, all of the conventional tag devices are disadvantageous in that they are single-bit devices. Further, while a conventional bar code may represent a multibit scheme, a conventional bar code cannot be remotely interrogated and read.

SUMMARY OF THE INVENTION

It is therefore an object of the present invention to provide a multibit tag (e.g., a sensor or identification device for coupling to an article) which can be encoded with multiple bits and which can be remotely interrogated and read.

In a first aspect of the invention, a tag is provided according to the present invention for storing multibit digital data, which includes a plurality of magnetic structures, each of the plurality of magnetic structures producing a discontinuous change in magnetization at a different externally applied magnetic field.

In a second aspect of the invention, an identification tag for storing multi-bit digital data, is provided according to the invention, which includes a substrate; an active magnetic material deposited on the substrate, the active magnetic material being demagnetized and annealed; a first nonmagnetic spacer layer deposited on the active magnetic material; a hard magnetic layer deposited onto the first nonmagnetic spacer layer; a second nonmagnetic spacer layer deposited onto the hard magnetic layer; and a soft magnetic shunt path layer deposited onto the second nonmagnetic spacer layer.

In a third aspect of the invention, a method, according to the invention, of constructing a multibit identification tag for storing digital data, includes steps of: depositing active magnetic material onto a substrate; demagnetizing and annealing the active magnetic material layer; depositing a first nonmagnetic spacer layer on the active magnetic material layer; depositing a hard magnetic layer over the first nonmagnetic spacer layer; depositing a second nonmagnetic spacer layer on the hard magnetic layer; and depositing a soft magnetic shunt path layer on the second nonmagnetic spacer layer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
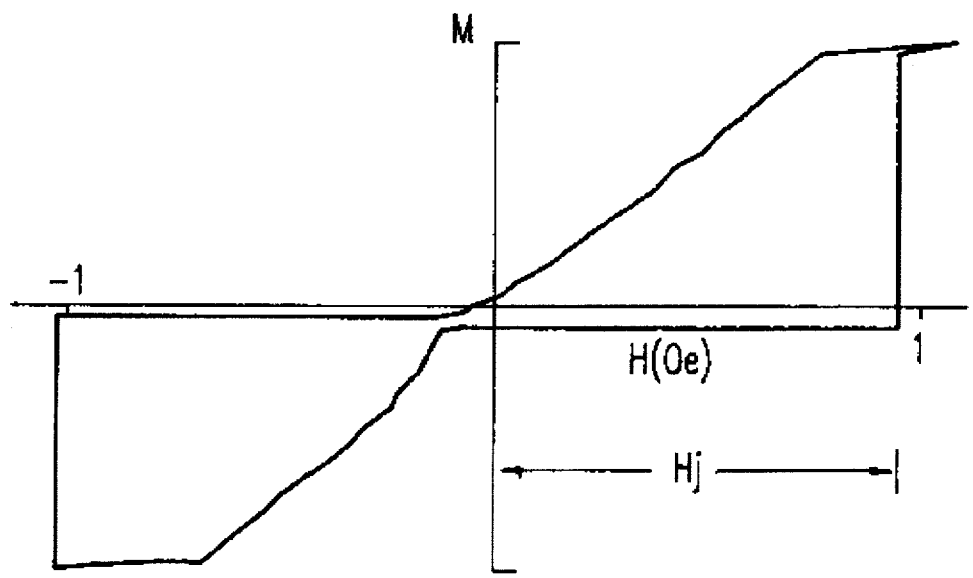
FIGS. 1A and 1B are graphs illustrating hysteresis loops of the conventional systems.
Figure 1B:
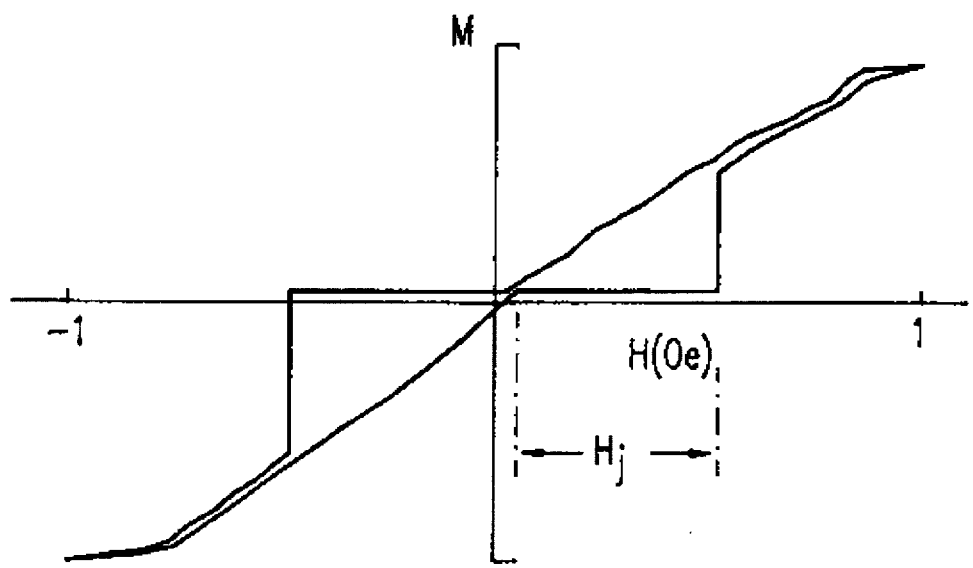
Figure 2A:
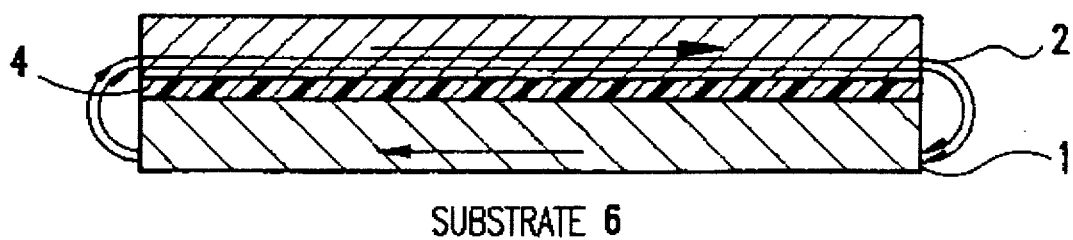
FIG. 2A is a cross-section of a one bit element of the multibit tag of the present invention.

Referring now to the drawings, and more particularly to FIG. 2A, there is shown a multibit device according to the present invention, in which the device uses an active element of a Barkhausen jump magnetic material (active magnetic material) in combination with a magnetic biasing structure having a hard magnetic material in its remanent state.

As shown in FIG. 2A, the basic structure includes a Barkhausen jump magnetic material 1 deposited on a substrate 6. Material 1 is preferably an amorphous magnetic alloy of CoNiFeSiB, with magnetostriction less than 5 ppm.

A nonmagnetic spacer layer 4, preferably comprising $SiO_2$ or TaN, is deposited/placed over the Barkhausen jump magnetic material 1 followed by a layer of hard magnetic material 2. "Hard magnetic materials" are materials having a high coercivity and a large remanent magnetization. Layer 2 preferably comprises a Co-Pt-Nb alloy, a Co-Pt-Ta alloy or hexagonal cobalt. The hard magnetic material is placed in a remanent state by applying a field large enough to saturate the hard magnetic material, and then decreasing/driving the applied field to zero.

Figure 2B:
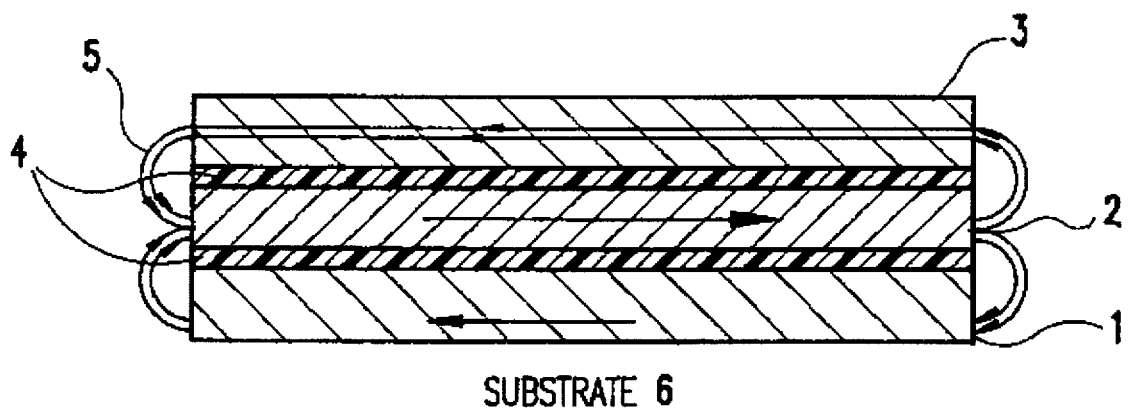
FIG. 2B is a cross-section of a one bit element of the multibit tag of the present invention.

As shown in FIG. 2B, there is added to the structure of FIG. 2A second layer of nonmagnetic spacer material 4 deposited over layer 2. Thereafter, a layer of soft magnetic material 3, the magnetic shunt layer, preferably comprising permalloy (80/20 Ni/Fe alloy) or a soft amorphous magnetic composition such as Fe-Ni-B-Si, is placed over the second nonmagnetic spacer. "Soft magnetic materials" are low-loss, low-coerciveforce, high-permeability materials. Arrows 5 indicate the direction of the magnetic field flow. The spacer layers 4, which are for prevention of exchange coupling, preferably have a thickness on the order of approximately 50 Å, whereas the magnetic layers 2, 3 preferably have a thickness on the order of 1000 Å. Substrate 6 can have any thickness as desired. In the preferred embodiment, layer 1 has a thickness relatively the same as layer 2. The Barhausen jump material experiences an internal bias field resulting from hard magnetic layer 2 modified by shunt layer 3.

In this structure, the Barkhausen jump occurs when the sum of the applied AC and DC fields $H_{appl}$ and the internal bias field $H_{bias}$ equals the Barkhausen jump field $H_j$.

The multibit tag according to the invention includes an array of such elements, each having a different bias field so that each responds to a different applied field, to thereby provide a different bit of information upon interrogation. The interrogation field is time varied so that the response signals of individual elements are separated in time.

For example, if three tags (1, 2 and 3) have internal bias fields of +0.5, +1.0 and +1.5 Oe, respectively, when the externally applied DC field reaches −0.5 Oe, the net bias field on tag 1 will be zero. Now it can be switched by a small AC field. For example, if the amplitude of the applied AC field is ±0.5 Oe and if the Barkhausen jump field is 0.4 Oe, tag 1 will be switched by the applied AC field. Tags 2 and 3 are still in the saturated state because they are at a field of +0.5 Oe ((+1.0+(−0.5)) and +1.0 Oe ((+1.5+(−0.5)), respectively. When the applied DC field reaches −1.0 Oe, tag 2 is switched by the AC field and produces a signal. Now elements 1 and 2 are saturated. When the applied DC field reaches −1.5 Oe, element 3 will be switched by the applied AC field and will produce a signal while elements 1 and 2 which are saturated are silent.

The effective internal bias field on the active element can be varied by controlling the reluctance of the shunt path. For example, if the shunt layer is absent, most of the flux from the bias layer will pass through the active element and the effective bias field will be the highest. If a thick layer of a high permeability material, such as an NiFe alloy, is used as a shunt, most of the flux will be diverted through the shunt and the effective bias field on the active element will be very low. Providing a range of bias fields on the active element provides a means of distinguishing individual bits. That is, the presence of a jump at a given externally applied DC field can correspond to a "1" of binary code and its absence to a "0".

Alternatively, the reluctance of a shunt layer of constant permeability and thickness can be varied by introducing one or more nonmagnetic gaps along its length, as shown in FIG. 2B, in which nonmagnetic gaps 10 are added to the soft magnetic material layer 3. Having nonmagnetic gaps 10 along the length, increases the reluctance of the shunt and provides a different effective bias field on the adjacent active magnetic element. The gaps preferably have a length of 0.2 mm and are separated from one another by a distance of 0.2–10 mm. The gaps may remain unfilled or alternatively can be filled with a diffused nonmagnetic material (e.g., $Ni_3Ge$) having been formed by depositing Ge on the soft magnetic shunt path layer 3. Other methods of controlling the reluctance include varying the thickness of the shunt layer. The preferred method for forming the gaps is discussed below.

The process of forming the tag structure discussed above will be described hereinafter.

To make the tags, the active magnetic material is sputter-deposited onto a substrate held at room temperature. As mentioned above, the substrate is preferably silicon or high temperature polymer such as a polyimide (e.g., tradename "Kapton" commercially available from E.I. DuPont de Nemours & Co.) or suitable material providing a high temperature dielectric with strong mechanical stability and electrical properties over a wide temperature range. A suitable composition for the active magnetic material is $(Fe_{0.06}Co_{0.94})_{79}Si_2B_{19}$ in the amorphous state. This layer is demagnetized and annealed in a zero field at 300° C. for 30 minutes. The magnetic material can be either electrically insulative or conductive.

A nonmagnetic spacer layer, preferably formed of $SiO_2$, TiN or the like, is deposited (preferably by sputtering) over the active magnetic layer. Thereafter, a hard magnetic layer deposited over the nonmagnetic spacer layer. The hard magnetic layer is preferably formed of Co-Pt-Nb alloy.

Thereafter, another nonmagnetic layer and finally the soft magnetic shunt path layer are deposited. The soft magnetic shunt path layer is preferably permalloy (80/20 Ni/Fe alloy) or a soft amorphous magnetic composition deposited below 200° C. It should be recognized that variations in the ordering (i.e., stacking or layering) of the layers 1, 2, 3 and 4 are possible and may be advantageous.

There are several methods for adjusting the bias field on individual tag elements. For example, the thickness of the shunt layer may be varied on different substrates which may be of the same material. The substrate/shunt layer pair may then be mechanically attached to the top layer 4 of a tag comprising layers 1, 4, 2 and 4 of FIG. 2B. By using substrate/shunt layer pairs having different thicknesses of shunt layer, the magnetic properties of the tag may be varied. A multibit tag may be assembled from several of such single tags having varying shunt layer thicknesses. This method is cost-effective with automated processing for a small number of bits (e.g., up to about 16).

Figure 2C:
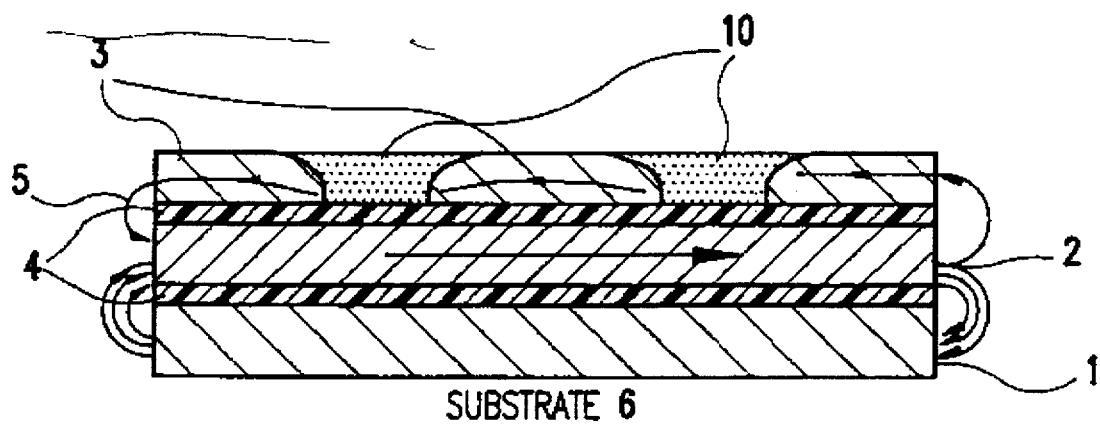
FIG. 2C is a cross-section of a one bit element of the multibit tag of the present invention with nonmagnetic gaps added.

A second method of personalizing the tags is to use a shunt layer having a uniform thickness which is modified by laser heating to render portions of it nonmagnetic. Such processing creates nonmagnetic gaps 10 (e.g., as shown in FIG. 2C) in the shunt path which modify its effective permeability. As mentioned above, the gaps can either remain open (e.g., an air space) or be filled with diffused nonmagnetic material (e.g., $Ni_3Ge$) having been formed by depositing Ge over the soft magnetic shunt path layer 3. To form a non-magnetic gap the Ge is diffused into the shunt layer by heating. The process of forming such a structure by heating is disclosed in copending, coassigned U.S. application Ser. No. 07-877,877 which was filed on May 1, 1992, and which is herein incorporated by reference. The important feature is that the shunt layer have portions which are nonmagnetic such that the permeability of the shunt path layer is modifiable.

Regarding the formation of the gaps and how they provide different information upon being interrogated, for example a first tag element, in an array of elements, without a gap in the shunt layer has the highest permeability shunt and thus the lowest effective bias field on the active layer. Switching (e.g., as mentioned above, the change in magnetization) of this element will occur at the highest value of the external bias field. A second tag element having a gap (e.g., a gap of 0.2 mm) in the shunt has a lower permeability shunt because of the nonmagnetic gap in the shunt layer. Thus, less magnetic flux from the hard magnetic layer passes through the shunt layer of this tag element and more magnetic field passes through the shunt layer of this tag element and more magnetic field passes through the active layer. The external bias field needed to switch this switching Barkhausen element will be lower than that of the first element. More gaps are introduced into subsequent elements in the array which allows more magnetic field to pass through the active layer.

In operation, the tag is interrogated by a time varying magnetic field (e.g., approximately 400 Hz in a preferred embodiment) or the like generated by a frequency generator or oscillator and is applied to the tag element with a coil. Simultaneously, a DC or slowly time varying magnetic field (e.g., approximately 10 Hz in a preferred embodiment of the invention) is applied to the tag. The DC or slowly time varying magnetic field is used to separate in time the signal from individual tag elements. The Barkhausen jump occurs when the sum of the external bias fields (AC+DC) and the bias field from the hard magnetic layer exceeds $H_j$.

In the multibit tag embodiment, the presence or absence of a Barkhausen jump can correspond to a code, e.g., a binary code of "1s" and "0s". Such a coded multibit tag is sometimes referred to as a personalized or programmed tag.

The magnetic material of the tag upon being interrogated (e.g., by a cyclic magnetic field or the like) will have its magnetization abruptly changed at the instant when the cyclic magnetic field reaches the critical magnetic field by large Barkhausen magnetic discontinuity, thereby changing the magnetic field of its surroundings. The magnetic reversal by a large Barkhausen discontinuity is extremely rapid so that the electrical signal induced in a sensing coil is large because the induced voltage depends on the time rate of change of the magnetic flux $d\phi/dt$. Additionally, because of the Barkhausen discontinuity, the magnetic field generated includes high order harmonic waves of the frequency of the given magnetic field. The generation of the harmonic wave of the magnetic field rather than the fundamental may be detected by a receiving apparatus suitably known in the art, thereby to provide more reliable reading of the digital information encoded on the tag.

Further, with the invention, based on the detected frequency code (e.g., the harmonic waves of the frequency) generated by the tag, decoding or interpretation of the code can be accomplished by a suitable decoding device, the structure of which is known in the art and which includes, for example, an interface between the receiving apparatus (e.g., a coil or the like) and a suitable processor including such known circuitry as an analog-to-digital (A/D) converter, suitable signal condition/processing circuitry, lookup tables and logic circuitry.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A multibit identification tag for storing digital data, comprising:

a plurality of magnetic structures, each of said plurality of magnetic structures producing a discontinuous change

7 in magnetization at a different externally applied magnetic field,
wherein each of said plurality of magnetic structures includes:
a substrate;
an Barkhausen jump magnetic material deposited on said substrate;
a first nonmagnetic spacer layer deposited on said Barkhausen jump magnetic material; and
a hard magnetic layer deposited onto said first nonmagnetic spacer layer, a second nonmagnetic spacer layer deposited onto said hard magnetic layer; and a soft magnetic shunt path layer deposited onto said second nonmagnetic spacer layer,
wherein each of said plurality of magnetic structures varies the effective magnetic field on each bit of said multibit tag, respectively, to allow said each bit to switch at a different applied magnetic field.

2. A multibit identification tag for storing digital data, comprising;
a plurality of magnetic structures, each of said plurality of magnetic structures producing a discontinuous change in magnetization at a different externally applied magnetic field,
wherein each of said plurality of magnetic structures includes:
a substrate;
an Barkhausen jump magnetic material deposited on said substrate;
a first nonmagnetic spacer layer deposited on said Barkhausen jump magnetic material;
a hard magnetic layer deposited onto said first nonmagnetic spacer layer;
a second nonmagnetic spacer layer deposited onto said hard magnetic layer; and
a soft magnetic shunt path layer deposited onto said second nonmagnetic spacer layer,
wherein said soft magnetic shunt path layer includes at least one gap formed therein.

3. A multibit identification tag for storing digital data, comprising:
a plurality of magnetic structures, each of said plurality of magnetic structures producing a discontinuous change in magnetization at a different externally applied magnetic field,
wherein each of said plurality of magnetic structures includes:
a substrate;
an Barkhausen jump magnetic material deposited on said substrate;
a first nonmagnetic spacer layer deposited on said Barkhausen jump magnetic material;
a hard magnetic layer deposited onto said first nonmagnetic spacer layer;
a second nonmagnetic spacer layer deposited onto said hard magnetic layer; and
a soft magnetic shunt path layer deposited onto said second nonmagnetic spacer layer,
wherein said soft magnetic shunt path layer includes at least one gap formed therein, said at least one gap incorporating nonmagnetic material therein.

4. A tag according to claim 3, wherein the thickness of said soft magnetic shunt path layer of a respective magnetic structure of said plurality of magnetic structures is selectively varied.

8

5. A tag according to claim 1 wherein the presence or absence of said discontinuous change in magnetization comprises a code.

6. A tag according to claim 5 wherein said code is a binary code.

7. A method of constructing a multibit identification tag for storing digital data, said method comprising steps of:
depositing Barkhausen jump magnetic material onto a substrate;
depositing a first nonmagnetic spacer layer on said Barkhausen jump magnetic material layer, said Barkhausen jump magnetic material layer being demagnetized and annealed;
depositing a hard magnetic layer over said first nonmagnetic spacer layer;
depositing a second nonmagnetic spacer layer on said hard magnetic layer; and
depositing a soft magnetic shunt path layer on said second nonmagnetic spacer layer, thereby to produce said multibit identification tag, said multibit identification tag comprising a plurality of magnetic structures, each of said plurality of magnetic structures producing a discontinuous change in magnetization at a different externally applied magnetic field and wherein each of said plurality of magnetic structures varies the effective magnetic field on each bit of said multibit tag, respectively, to allow said each bit to switch at a different applied magnetic field.

8. A method as in claim 7, further comprising a step of magnetizing the hard magnetic layer by applying an external field thereto.

9. A method as in claim 8, further comprising steps of driving the hard magnetic layer to saturation, and decreasing the external field applied thereto to zero, thereby to leave the hard magnetic layer in its remanent state.

10. A method as in claim 7, wherein said soft magnetic shunt path layer is deposited in different thicknesses.

11. A method as in claim 7, wherein said step of depositing said soft magnetic shunt layer comprises a step of evenly depositing said soft magnetic layer,
said method further comprising a step of heating designated portions of said soft magnetic material to render said designated portions nonmagnetic.

12. A method as in claim 11, wherein said step of heating includes a step of laser heating said designated portions.

13. A method as in claim 7, wherein said step of annealing includes annealing said active magnetic material layer at 300° C. for 30 minutes.

14. A method as in claim 7, wherein said step of depositing said Barkhausen jump magnetic material onto said substrate includes a step of sputter depositing said Barkhausen jump magnetic material.

15. A method as in claim 7, further comprising a step of maintaining said substrate at room temperature.

16. A method as in claim 7, wherein said soft magnetic shunt layer is one of a permalloy and a soft amorphous magnetic composition deposited below 200° C., further comprising a step of maintaining said substrate at room temperature.

17. A method as in claim 7, further comprising a step of adjusting a bias field on individual tag elements.

18. A method as in claim 7, further comprising a step of rendering portions of said soft magnetic shunt path layer nonmagnetic.

19. A method of constructing a multibit identification tag for storing digital dam, said method comprising the steps of:

depositing Barkhausen jump magnetic material onto a first substrate;

depositing a first nonmagnetic spacer layer on said Barkhausen jump magnetic material layer, said Barkhausen jump magnetic material layer being demagnetized and annealed;

depositing a hard magnetic layer over said first nonmagnetic spacer layer;

depositing a second nonmagnetic spacer layer on said hard magnetic layer; and providing a soft magnetic shunt path layer on said second nonmagnetic spacer layer, thereby to produce said multibit identification tag, said multibit identification tag comprising:

a first substrate;

an Barkhausen jump magnetic material deposited on said first substrate;

a first nonmagnetic spacer layer deposited on said Barkhausen jump magnetic material;

a hard magnetic layer deposited onto said first nonmagnetic spacer layer;

a second nonmagnetic spacer layer deposited onto said hard magnetic layer; and a soft magnetic shunt path layer deposited onto said second nonmagnetic spacer layer.

20. A method as in claim 19, wherein said soft magnetic shunt path layer is first deposited on a second substrate and said substrate/shunt layer is attached to said second nonmagnetic spacer layer and wherein the thicknesses of said shunt layer is varied within said multibit tag.

21. An identification tag for storing multi-bit digital data, comprising:

a substrate;

an Barkhausen jump magnetic material deposited on said substrate;

a first nonmagnetic spacer layer deposited on said Barkhausen jump magnetic material;

a hard magnetic layer deposited onto said first nonmagnetic spacer layer;

a second nonmagnetic spacer layer deposited onto said hard magnetic layer; and a soft magnetic shunt path layer deposited onto said second nonmagnetic spacer layer.

22. An identification tag for storing multi-bit digital data, comprising:

a substrate;

an Barkhausen jump magnetic material deposited on said substrate;

a first nonmagnetic spacer layer deposited on said Barkhausen jump magnetic material;

a hard magnetic layer deposited onto said first nonmagnetic spacer layer;

a second nonmagnetic spacer layer deposited onto said hard magnetic layer; and a soft magnetic shunt path layer deposited onto said second nonmagnetic spacer layer, wherein said soft magnetic shunt path layer includes at least one gap formed therein.

23. An identification tag for storing multi-bit digital data, comprising:

a substrate;

an Barkhausen jump magnetic material deposited on said substrate;

a first nonmagnetic spacer layer deposited on said Barkhausen jump magnetic material;

a hard magnetic layer deposited onto said first nonmagnetic spacer layer;

a second nonmagnetic spacer layer deposited onto said hard magnetic layer; and a soft magnetic shunt path layer deposited onto said second nonmagnetic spacer layer, wherein said soft magnetic shunt path layer includes at least one gap formed therein, said at least one gap incorporating nonmagnetic material therein.

\* \* \* \* \*